Figure 1:
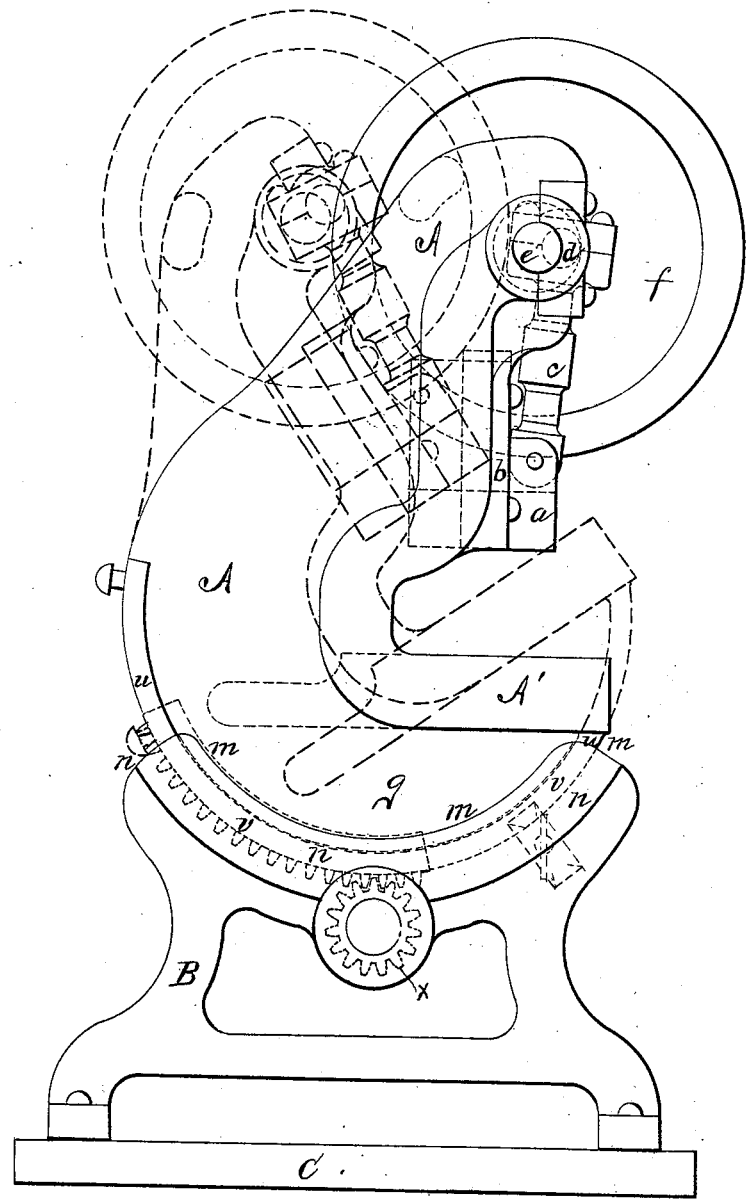

2 Sheets—Sheet 1.

E. W. BLISS.
Machinery for Shaping Sheet-Metal.

No. 217,725. Patented July 22, 1879.

Witnesses—
Henry W. Parker
Wm. R. Whitney

Inventor—
Eliphalet W. Bliss
per James A. Whitney
Attorney.

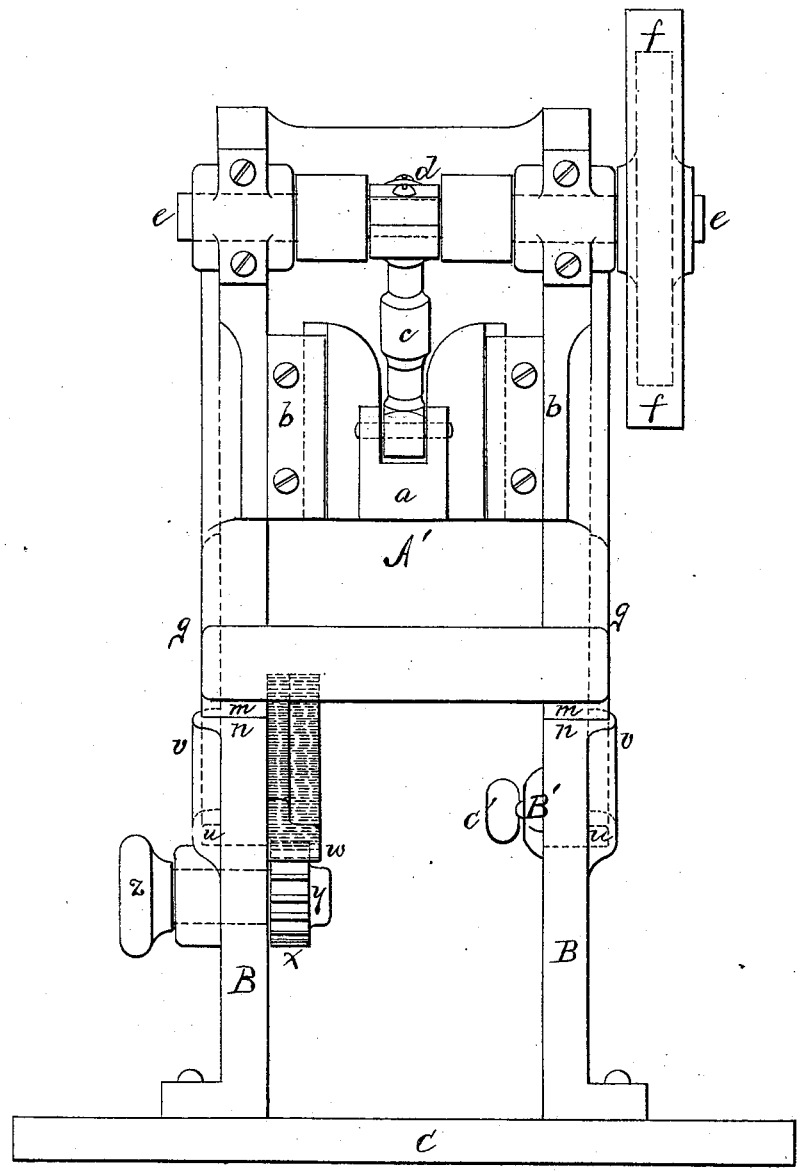

UNITED STATES PATENT OFFICE.

ELIPHALET W. BLISS, OF BROOKLYN, NEW YORK.

IMPROVEMENT IN MACHINERY FOR SHAPING SHEET METAL.

Specification forming part of Letters Patent No. 217,725, dated July 22, 1879; application filed April 14, 1879.

*To all whom it may concern:*

Be it known that I, ELIPHALET W. BLISS, of the city of Brooklyn, in the county of Kings and State of New York, have invented certain Improvements in Machinery for Stamping and Shaping Sheet Metal, and for other like purposes, of which the following is a specification.

This invention relates to machinery for stamping or shaping sheet metal and for like or analogous uses. Its object is to provide an extremely strong and durable apparatus, which shall be simple in construction and capable of being very conveniently manipulated, and which, moreover, shall have its bed adjustable at any angle to the horizontal, with the line of motion of its die or stamp at a corresponding angle from the vertical, which the exigencies of the work may require.

In my said invention there is combined with a base having arc-shaped bearings a frame constructed with similar bearings, and also constructed with a bed for holding a die or like device, and carrying a movable head and mechanism for giving the requisite movement to the said head, whereby effectual provision is made for securing the advantageous results hereinbefore set forth.

The invention further comprises a novel combination, with the just hereinbefore-specified parts, of a curved rack and a pinion, whereby provision is made for the facile and convenient adjustment of the die-holding bed to any angle which the exigencies of use may require.

The invention also comprises certain other novel combinations of parts calculated to promote the increased utility and practical value of the machine.

Figure 1 is a side elevation of a press made according to my invention, and Fig. 2 is a front view of the same.

A is the frame which carries the operative mechanism, which comprises substantially a sliding head, $a$, capable of a vertical movement—as, for example, in the guides $b$—and which is operated by a pitman, $c$, or, in lieu thereof, by an eccentric or other equivalent of said crank. The shaft $e$ of the crank may be rotated by power from a band-wheel, $f$; or, when desired, suitable mechanism may be applied in connection with said shaft for giving motion to the head $a$ by hand, or may be modified in any usual or appropriate manner to be operated by the foot of the attendant. A' is the bed upon which the lower die or portion of the hereinbefore-indicated operative mechanism is situated, but which, like the upper portion just referred to of said mechanism, being well known, needs no specific description here. This bed A' is preferably cast in one with the frame A. The sides, $g$, of the frame A are extended downward to form bearings $m$, formed on the arc of a circle, one at each side of the bottom of the frame. These bearings $m$ should also be cast in one with the other portions of the frame A.

The base of the machine is composed of two uprights, B, bolted at their feet to a base-plate, C, and each concave on its upper side to form bearings $n$, shaped on the arc of a circle, and adapted and adjusted to receive the arc-shaped bearings $m$ of the frame A.

It is manifest that when the bearings $m$ are caused to move in the bearings $n$ in one direction or the other the frame A will be tilted backward or forward, as the case may be, and thereby be brought with its bed at any desired angle to the horizontal, and its operative mechanism at a corresponding angle to the vertical. In order to prevent the lateral displacement of the bearings $m$ from the bearings $n$, each upright B has cast upon it, at the outer edge of the arc-shaped bearing $n$ thereof, an upwardly-projecting flange or guide, $r$, which, projecting past the adjacent edge of the contiguous bearing $m$, co-operates with the correspondingly-arranged guide $r$ on the opposite side of the base to prevent any lateral displacement of the frame A. To prevent the latter from being lifted away from the base during the rough usage of actual working, there is cast upon the outer edge of each bearing $m$ a rib, $u$, which fits into an arc-shaped groove formed in the inner surface of the adjacent guide $r$. Inasmuch as the ribs and grooves correspond in curvature and direction with the bearings $m$ and $n$, the frame is kept from rising away from the base without any interference with the adjustability of the frame, as hereinbefore set forth.

In order that the frame may be readily adjusted, there is cast upon the inner side of one of its bearings $m$ a rack, $w$, having a curvature corresponding to that of the bearings $m$ $n$; and gearing into this rack is a toothed pinion, $x$, the shaft $y$ of which is suitably supported in the adjacent side of the base, and which is provided at its outer extremity with a hand-wheel, $z$, whereby the pinion may be turned to move the rack, and consequently the bearings $m$ of the frame A, in one direction or the other, as may be required. Attached to the opposite side of the base is a strong button, B′, pivoted on a set-screw, C′, so that the button being set across the adjacent bearings $m\ n$ and tightened against the same by turning the screw in the requisite direction the bearing $m$ is griped between the button and the adjacent guide $r$, and is thereby steadied and held with greater firmness than would be the case without the use of a fastening for the purpose.

What I claim as my invention is—

1. The frame A, constructed with the bed A′ and arc-shaped bearings $m$, and carrying the head $a$, and mechanism, substantially as described, for giving movement to said head, in combination with the base B, constructed with the arc-shaped bearings $n$, substantially as and for the purpose herein set forth.

2. The curved rack $w$ and the pinion $x$, in combination with the base having arc-shaped bearings and the frame A, having arc-shaped bearings and a bed, A′, and carrying the head $a$ and the mechanism for giving motion to the said head, whereby the head $a$ and bed A′ may be brought to any angle from the horizontal that the work may require, substantially as and for the purpose herein set forth.

3. The combination of the base composed of the two uprights B, each formed with an arc-shaped bearing, the frame A, constructed with lateral arc-shaped bearings, and the lateral guides $r$, placed to retain the bearings of the frame A in due position upon the bearings formed on the standard, the whole constructed and arranged substantially as and for the purpose herein set forth.

4. The combination of the adjustable frame constructed with the arc-shaped bearings and carrying the operative mechanism, the base having arc-shaped bearings to receive those of the aforesaid frame, lateral guides for retaining said frame and base in due relation with each other, and a rack and pinion for adjusting the frame upon the base, all substantially as and for the purpose herein set forth.

ELIPHALET W. BLISS.

Witnesses:
JAMES A. WHITNEY,
HENRY F. PARKER.